United States Patent
Prokop et al.

(10) Patent No.: US 11,640,592 B2
(45) Date of Patent: May 2, 2023

(54) SYSTEM, METHOD, AND APPARATUS FOR INTEGRATING MULTIPLE PAYMENT OPTIONS ON A MERCHANT WEBPAGE

(71) Applicant: Visa International Service Association, San Francisco, CA (US)

(72) Inventors: Bartlomiej Piotr Prokop, Belfast (GB); Rhidian Desmond Thomas John, Helen's Bay (GB); Thomas Joseph Looney, Belfast (GB); Timothy Hodkinson, Moira (GB); Bryan Carroll, Livermore, CA (US); Nathan Morgan, Georgetown, TX (US); Brian McManus, Seattle, WA (US); Andre Walter Machicao, Woodside, CA (US); Clinton Lopaka Florez, NE Sammamish, WA (US); Rajiv Dutta, Palo Alto, CA (US); James Donaldson, Moira (GB); Shobhit Agrawal, Bothell, WA (US); Niall McGurk, Belfast (GB)

(73) Assignee: Visa International Service Association, San Francisco, CA (US)

( * ) Notice: Subject to any disclaimer, the term of this patent is extended or adjusted under 35 U.S.C. 154(b) by 143 days.

(21) Appl. No.: 16/931,516

(22) Filed: Jul. 17, 2020

(65) Prior Publication Data
US 2021/0019716 A1 Jan. 21, 2021

Related U.S. Application Data

(60) Provisional application No. 62/876,117, filed on Jul. 19, 2019.

(51) Int. Cl.
*G06Q 20/10* (2012.01)
*G06Q 20/08* (2012.01)
(Continued)

(52) U.S. Cl.
CPC ......... *G06Q 20/102* (2013.01); *G06Q 20/085* (2013.01); *G06Q 20/3825* (2013.01); *G06Q 20/3829* (2013.01); *G06Q 20/38215* (2013.01)

(58) Field of Classification Search
CPC .............. G06Q 20/102; G06Q 20/085; G06Q 20/38215; G06Q 20/3825; G06Q 20/3829; G06Q 20/385; G06Q 20/12
(Continued)

(56) References Cited

U.S. PATENT DOCUMENTS

| | | | |
|---|---|---|---|
| 8,931,084 B1 * | 1/2015 | Paya | H04L 67/34 713/160 |
| 10,565,596 B2 * | 2/2020 | DeTella | G06F 8/38 |
| 11,429,951 B1 * | 8/2022 | Bu | G06Q 20/341 |
| 2012/0089481 A1 * | 4/2012 | Iozzia | H04N 7/16 726/5 |

(Continued)

FOREIGN PATENT DOCUMENTS

| WO | 2013067121 A1 | 5/2013 |
|---|---|---|
| WO | 2014116818 A1 | 7/2014 |

OTHER PUBLICATIONS

Solat "Security of Electronic Payment Systems: A Comprehensive Survey", Jan. 1, 2017, 29 pages (Year: 2017).*

*Primary Examiner* — James D Nigh
(74) *Attorney, Agent, or Firm* — The Webb Law Firm

(57) ABSTRACT

A system, method, and apparatus is provided for integrating multiple payment options on a merchant webpage. The method includes receiving, from a merchant system associated with a merchant webpage, a payment data capture request, generating, with at least one processor, web payment capture data based on the payment data capture request, the web payment capture data configured to adapt the merchant webpage to receive payment information input by a user, communicating, to the merchant system, the web payment capture data, receiving, directly from a client computer via at least one client-side script executed by the client computer based on the web payment capture data, the
(Continued)

payment information input by the user, generating, with at least one processor, a transient payment token based on the payment information, and directly communicating the transient payment token to the client computer.

20 Claims, 5 Drawing Sheets

(51) Int. Cl.
*G06Q 20/38* (2012.01)
*G06Q 20/12* (2012.01)

(58) Field of Classification Search
USPC .......................................................... 705/77
See application file for complete search history.

(56) References Cited

U.S. PATENT DOCUMENTS

| | | | | |
|---|---|---|---|---|
| 2013/0318348 | A1* | 11/2013 | Lebron | H04L 63/0428 |
| | | | | 713/168 |
| 2014/0089201 | A1* | 3/2014 | Jakulin | G06Q 20/1235 |
| | | | | 705/64 |
| 2016/0342997 | A1* | 11/2016 | De Tella | G06Q 20/382 |
| 2017/0098215 | A1* | 4/2017 | Brotsky | G06Q 20/4037 |
| 2017/0193511 | A1* | 7/2017 | Dominguez | G06Q 30/0601 |
| 2017/0200150 | A1* | 7/2017 | Cohn | G06Q 20/3674 |
| 2017/0213200 | A1* | 7/2017 | Purves | G06Q 20/227 |
| 2018/0047021 | A1* | 2/2018 | Uppalapati | G06Q 20/385 |
| 2018/0060867 | A1* | 3/2018 | Hagan | G06Q 20/34 |
| 2018/0293573 | A1* | 10/2018 | Ortiz | G06Q 20/382 |
| 2019/0116037 | A1* | 4/2019 | Donaldson | H04L 9/14 |
| 2019/0325445 | A1* | 10/2019 | Anderson | G07G 1/0036 |

* cited by examiner

SYSTEM, METHOD, AND APPARATUS FOR INTEGRATING MULTIPLE PAYMENT OPTIONS ON A MERCHANT WEBPAGE

CROSS REFERENCE TO RELATED APPLICATION

The present application claims the benefit of the filing date and priority to U.S. Provisional Patent Application No. 62/876,117, filed on Jul. 19, 2019, the entire disclosure of which is incorporated by reference herein.

BACKGROUND

1. Field

This disclosure relates generally to web-based transactions and, in non-limiting embodiments, to a system, method, and apparatus for integrating multiple payment options on a merchant webpage.

2. Technical Considerations

Currently, merchants that wish to offer their customers multiple payment options must utilize separate libraries, separate Application Programming Interfaces (APIs), and other separate configurations for each individual payment method. Merchants also desire the ability to personalize placements of visual components of payment graphic user interfaces (GUIs) in order to ensure the clients have a desired payment experience. Currently, merchants must also receive payment information directly from the users, requiring the merchants to take additional security measures to protect the sensitive payment information provided by the users. Some sensitive information, such as a card CVV, may not be allowed to be stored post authorization, even in encrypted form, which may provide challenges to many merchants, including smaller companies with limited resources. Systems used by merchants currently to process online payments through web browsers are slow, unreliable, erratic, and untrustworthy as security and reliability issues can arise due to browser version, platform version, hardware type, display size, and/or network hopping between mobile and traditional networks.

SUMMARY

According to non-limiting embodiments or aspects, provided is a computer-implemented method comprising: receiving, from a merchant system associated with a merchant webpage, a payment data capture request; generating, with at least one processor, web payment capture data based on the payment data capture request, the web payment capture data configured to adapt the merchant webpage to receive payment information input by a user; communicating, to the merchant system, the web payment capture data; receiving, directly from a client computer via at least one client-side script executed by the client computer based on the web payment capture data, the payment information input by the user; generating, with at least one processor, a transient payment token based on the payment information; and directly communicating the transient payment token to the client computer.

In non-limiting embodiments or aspects, the method further comprises receiving, from the merchant system associated with the merchant webpage, a selected payment method, and generating a consumer data capture field comprising at least one consumer data capture field based on the selected payment method. The computer-implemented method may further comprise generating normalized payment information by normalizing the payment information based on the payment method, wherein the transient payment token comprises the normalized payment information. The web payment capture data may be configured to adapt the merchant webpage by generating, on the merchant webpage, at least a portion of a graphical user interface (GUI) configured to receive the payment information from the user; and configuring the at least one client-side script to validate the web payment capture data and process the payment information. At least a portion of the payment information may be stored only in active memory.

In non-limiting embodiments or aspects, the method may further comprise generating a cryptographic signature of the web payment capture data, wherein the at least one client-side script is configured to validate the web payment capture data based on the cryptographic signature. The method may further comprise encrypting the payment information with the at least one client-side script based on a public key embedded in the web payment capture data. The web payment capture data may be configured to adapt the merchant webpage by configuring the merchant webpage to initiate a transaction through a single Application Programming Interface (API) call. The at least one client-side script may be configured to pass the transient payment token from the client computer to the merchant system via the merchant webpage.

In non-limiting embodiments, the method may further comprise receiving the transient payment token from the merchant system; and generating an authorization request based on the transient payment token.

According to non-limiting embodiments or aspects, provided is a system for integrating multiple payment options on a merchant webpage, comprising at least one processor programmed or configured to: receive, from a merchant system associated with a merchant webpage, a payment data capture request; generate web payment capture data based on the payment data capture request, the web payment capture data configured to adapt the merchant webpage to receive payment information input by a user; communicate, to the merchant system, the web payment capture data; receive, directly from a client computer via at least one client-side script executed by the client computer based on the web payment capture data, the payment information input by the user; generate a transient payment token based on the payment information; and directly communicate the transient payment token to the client computer.

In non-limiting embodiments, the at least one processor may be further programmed or configured to receive, from the merchant system associated with the merchant webpage, a selected payment method, and generate a consumer data capture field comprising at least one consumer data capture field based on the selected payment method. The at least one processor may be further programmed or configured to generate normalized payment information by normalizing the payment information based on the payment method, wherein the transient payment token comprises the normalized payment information. The web payment capture data may be configured to adapt the merchant webpage by: generating, on the merchant webpage, at least a portion of a graphical user interface (GUI) configured to receive the payment information from the user; and configuring the at least one client-side script to validate the web payment capture data and process the payment information.

In non-limiting embodiments, the at least one processor may be further programmed or configured to generate a cryptographic signature of the web payment capture data, wherein the at least one client-side script is configured to validate the web payment capture data based on the cryptographic signature. The at least one processor may be further programmed or configured to encrypt the payment information with the at least one client-side script based on a public key embedded in the web payment capture data. The web payment capture data is configured to adapt the merchant webpage by configuring the merchant webpage to initiate a transaction through a single Application Programming Interface (API) call. The at least one client-side script is configured to pass the transient payment token from the client computer to the merchant system via the merchant webpage.

In non-limiting embodiments, the at least one processor may be further programmed or configured to: receive the transient payment token from the merchant system; and generate an authorization request based on the transient payment token.

According to non-limiting embodiments or aspects, provided is a computer program product for integrating multiple payment options on a merchant webpage, comprising at least one non-transitory computer-readable medium including program instructions that, when executed by at least one processor, cause the at least one processor to: receive, from a merchant system associated with a merchant webpage, a payment data capture request; generate web payment capture data based on the payment data capture request, the web payment capture data configured to adapt the merchant webpage to receive payment information input by a user; communicate, to the merchant system, the web payment capture data; receive, directly from a client computer via at least one client-side script executed by the client computer based on the web payment capture data, the payment information input by the user; generate a transient payment token based on the payment information; and directly communicate the transient payment token to the client computer.

Other non-limiting embodiments or aspects will be set forth in the following numbered clauses:

Clause 1: A computer-implemented method comprising: receiving, from a merchant system associated with a merchant webpage, a payment data capture request; generating, with at least one processor, web payment capture data based on the payment data capture request, the web payment capture data configured to adapt the merchant webpage to receive payment information input by a user; communicating, to the merchant system, the web payment capture data; receiving, directly from a client computer via at least one client-side script executed by the client computer based on the web payment capture data, the payment information input by the user; generating, with at least one processor, a transient payment token based on the payment information; and directly communicating the transient payment token to the client computer.

Clause 2: The computer-implemented method of clause 1, further comprising receiving, from the merchant system associated with the merchant webpage, a selected payment method, and generating a consumer data capture field comprising at least one consumer data capture field based on the selected payment method.

Clause 3: The computer-implemented method of clauses 1 or 2, further comprising generating normalized payment information by normalizing the payment information based on the payment method, wherein the transient payment token comprises the normalized payment information.

Clause 4: The computer-implemented method of any of clauses 1-3, wherein the web payment capture data is configured to adapt the merchant webpage by: generating, on the merchant webpage, at least a portion of a graphical user interface (GUI) configured to receive the payment information from the user; and configuring the at least one client-side script to validate the web payment capture data and process the payment information.

Clause 5: The computer-implemented method of any of clauses 1-4, further comprising generating a cryptographic signature of the web payment capture data, wherein the at least one client-side script is configured to validate the web payment capture data based on the cryptographic signature.

Clause 6: The computer-implemented method of any of clauses 1-5, further comprising encrypting the payment information with the at least one client-side script based on a public key embedded in the web payment capture data.

Clause 7: The computer-implemented method of any of clauses 1-6, wherein the web payment capture data is configured to adapt the merchant webpage by configuring the merchant webpage to initiate a transaction through a single Application Programming Interface (API) call.

Clause 8: The computer-implemented method of any of clauses 1-7, wherein the at least one client-side script is configured to pass the transient payment token from the client computer to the merchant system via the merchant webpage.

Clause 9: The computer-implemented method of any of clauses 1-8, further comprising: receiving the transient payment token from the merchant system; and generating an authorization request based on the transient payment token.

Clause 10: A system for integrating multiple payment options on a merchant webpage, comprising at least one processor programmed or configured to: receive, from a merchant system associated with a merchant webpage, a payment data capture request; generate web payment capture data based on the payment data capture request, the web payment capture data configured to adapt the merchant webpage to receive payment information input by a user; communicate, to the merchant system, the web payment capture data; receive, directly from a client computer via at least one client-side script executed by the client computer based on the web payment capture data, the payment information input by the user; generate a transient payment token based on the payment information; and directly communicate the transient payment token to the client computer.

Clause 11: The system of clause 10, wherein the at least one processor is further programmed or configured to receive, from the merchant system associated with the merchant webpage, a selected payment method, and generate a consumer data capture field comprising at least one consumer data capture field based on the selected payment method.

Clause 12: The system of clauses 10 or 11, wherein the at least one processor is further programmed or configured to generate normalized payment information by normalizing the payment information based on the payment method, wherein the transient payment token comprises the normalized payment information.

Clause 13: The system of any of clauses 10-12, wherein the web payment capture data is configured to adapt the merchant webpage by: generating, on the merchant webpage, at least a portion of a graphical user interface (GUI) configured to receive the payment information from the user; and configuring the at least one client-side script to validate the web payment capture data and process the payment information.

Clause 14: The system of any of clauses 10-13, wherein the at least one processor is further programmed or configured to generate a cryptographic signature of the web payment capture data, wherein the at least one client-side script is configured to validate the web payment capture data based on the cryptographic signature.

Clause 15: The system of any of clauses 10-14, wherein the at least one processor is further programmed or configured to encrypt the payment information with the at least one client-side script based on a public key embedded in the web payment capture data.

Clause 16: The system of any of clauses 10-15, wherein the web payment capture data is configured to adapt the merchant webpage by configuring the merchant webpage to initiate a transaction through a single Application Programming Interface (API) call.

Clause 17: The system of any of clauses 10-16, wherein the at least one client-side script is configured to pass the transient payment token from the client computer to the merchant system via the merchant webpage.

Clause 18: The system of any of clauses 10-17, wherein the at least one processor is further programmed or configured to: receive the transient payment token from the merchant system; and generate an authorization request based on the transient payment token.

Clause 19: A computer program product for integrating multiple payment options on a merchant webpage, comprising at least one non-transitory computer-readable medium including program instructions that, when executed by at least one processor, cause the at least one processor to: receive, from a merchant system associated with a merchant webpage, a payment data capture request; generate web payment capture data based on the payment data capture request, the web payment capture data configured to adapt the merchant webpage to receive payment information input by a user; communicate, to the merchant system, the web payment capture data; receive, directly from a client computer via at least one client-side script executed by the client computer based on the web payment capture data, the payment information input by the user; generate a transient payment token based on the payment information; and directly communicate the transient payment token to the client computer.

Clause 20: The computer-implemented method of any of clauses 1-9, wherein at least a portion of the payment information is stored only in active memory.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figure and appendices, in which.

DESCRIPTION OF THE PREFERRED EMBODIMENTS

Figure 1:
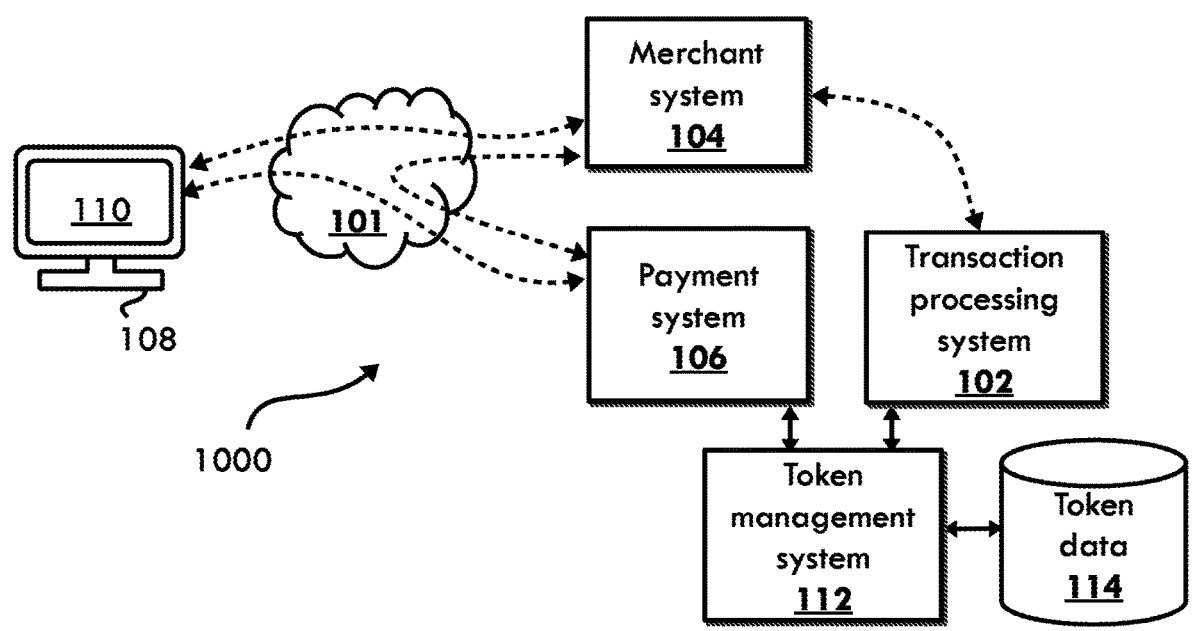
FIG. 1 a schematic diagram of a system for integrating multiple payment options on a merchant webpage and conducting a transaction according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" (GUI) refers to a generated display, such as one or more GUIs with which a user may interact, either directly or indirectly (e.g., through a keyboard, mouse, touchscreen, etc.).

Non-limiting embodiments allow for merchants to offer secure payment options on a merchant webpage or application in a manner that is agnostic to the payment method being used (e.g., a PAN corresponding to a payment device, PayPal®, Visa Checkout®, ACH transfer, and/or the like). In non-limiting embodiments, a single API is provided for merchants through a single client-side library, allowing merchants the flexibility to accept a variety of payment methods without requiring separate libraries, APIs, and other configurations for each individual payment method while also allowing the merchant control over placement of user interface components. In some non-limiting embodiments, parameters for a particular payment method are mapped to generic parameters/variables to allow for the creation of a payment token that is agnostic to the payment method. Non-limiting embodiments may be performed by a payment system, such as a payment gateway or third-party service, in communication with a merchant system and a transaction processing system, although it will be appreciated that various arrangements are possible. In some non-limiting embodiments, sensitive data may be stored in RAM only, allowing for increased security of payments. In some non-limiting embodiments, the payment token may allow a payment to be processed without the merchant directly storing the user payment information.

Moreover, some non-limiting embodiments provide for increased security and efficiency by facilitating direct communication between a web browser on a client computer and the payment system, avoiding the need for an additional flow of data through a merchant's server and the associated bandwidth, resources, and security concerns. Through the unique arrangement of systems and data flows between those systems, non-limiting embodiments reduce the burden on merchant systems that seek to accept payments for transactions by providing dynamic, content-rich web-based interfaces that integrate into the merchant's webpage and result in the merchant system having possession of a transient payment token for initiating a transaction.

FIG. 1 depicts a system 1000 for integrating multiple payment options on a merchant webpage according to a non-limiting embodiments. The system includes a client computing device 108 which displays a merchant webpage 110. The client computing device 108 may be a client computer, client mobile device, and/or the like. The merchant webpage 110 is in communication with a merchant system 104 and/or a payment system 106 through a network 101. The payment system 106 may be a payment gateway or other service provider. In some non-limiting embodiments, the payment system 106 may be part of a transaction processing system 102. The merchant system 104 may include one or more computing devices running one or more software programs. The merchant system 104 may host the merchant webpage 110 by providing web content to the client computing device 108. The merchant system 104 may be in communication with the payment system 106 through the network 101.

In non-limiting embodiments, and with continued reference to FIG. 1, a user may request access to a merchant webpage 110 through a client computing device 108. As an example, the user may be a client (e.g., customer) of the merchant that navigates to the merchant's website using a web browser. A client-side script may be downloaded along with the merchant webpage 110 to the client computing device 108 and executed. The client-side script may be incorporated into a software development kit (SDK) associated with the merchant webpage 110. The user may initiate a payment request through the merchant webpage 110, such as a request to make a payment for a product or service. The merchant webpage 110 may communicate the payment request to the merchant system 104. The payment request may be initiated by a user selecting a checkout link or selecting a link to make a payment.

With continued reference to FIG. 1, in response to receiving the payment request, the merchant system 104 may communicate a payment data capture request to the payment system 106. The payment data capture request may include one or more data structures including at least one merchant front-end parameter (e.g., a Content Security Policy (CSP), a merchant identifier, configuration options for a user interface of merchant webpage 110, and/or the like). The payment data capture request may include the intended usage (e.g., adapting a merchant webpage 110 to include a multi-field microform or using the web payment capture data to prebuild a checkout page of the merchant webpage 110) and related parameters (e.g., language settings, origin to host microform frames, and/or the like). The payment data capture request may include payment methods that will be accepted by the merchant (e.g., credit card, debit card, online money transfers, third-party payment services, and/or the like). The payment system 106 may generate web payment capture data based on the payment data capture request, payment method, and/or merchant front-end parameters. The web payment capture data may be one or more data structures including the merchant input and configuration data for the merchant webpage 110 (e.g., GUI elements, URLs for one or more frames (e.g., iFrames® or the like), URLs for JavaScript with Subresource Integrity (SRI) hashes, a layout of webpages and/or frames of webpages, and/or the like). The payment system 106 may communicate with a third-party payment service to determine data and data structure format necessary to process a payment through the third-party payment service. The web payment capture data may incorporate a Content Security Policy (CSP). In some non-limiting embodiments, the web payment capture data may include a Javascript Object Notation (JSON) Web Token (JWT) payload, as an example. It will be appreciated that various different data schemas may be used for representing the web payment capture data.

With continued reference to FIG. 1, the web payment capture data may be communicated to the merchant system 104 by the payment system 106. The web payment capture data may then be communicated by the merchant system 104 to the client computing device 108 as part of the merchant webpage 110. The web payment capture data may also be communicated directly to the client computing device 108 by the payment system 106. The web payment capture data may be generated with a cryptographic signature. For example, the web payment capture data may be signed with a private key of a public/private key pair that allows the cryptographic signature (e.g., digital signature) to be verified with any entity having the public key, thus establishing that the source of the web payment capture data holds the private key and is therefore trusted. When communicated to the client computing device 108 via the merchant system 104, the web payment capture data may cause the client computing device 108 to adapt the merchant webpage 110 (e.g. web browser) to receive payment information input from the user through the client computing device 108.

With continued reference to FIG. 1, the merchant webpage 110 may be adapted based on the web payment capture data to include a payment collection GUI that enables a user to select a payment method and allow the user to enter payment information (e.g., a method of payment, a PAN or other account identifier, expiration date, security code, verification value, transaction amount, and/or the like). The payment collection GUI may be generated using configuration information in the web payment capture data and at least one client-side script that is identified (e.g., pointed to) within the web payment capture data. The client-side script may also be communicated separately along with the web payment capture data, or may be included in the web payment capture data. The client-side script may be downloaded to the client computing device 108 after receiving the web payment capture data or once the location of the client-side script is identified to the client computing device 108. The configuration information may specify code configured to display forms, including one or more fields, and other selectable options such as buttons, checkboxes, drop-down menus, and/or the like. The payment collection GUI may be presented within a frame, such as an iFrame®, embedded within the merchant website 110, or may be the entire merchant website 110. As an example, the web payment capture data may include HTML and/or other web data configured to embed a frame into the merchant webpage 110 that loads content from an identified network resource (e.g., a domain independent of the merchant system 104, such as a webpage hosted by the payment system 106).

With continued reference to FIG. 1, the client-side script downloaded to the client computing device 108 may validate the web payment capture data based on the cryptographic signature of the web payment capture data. The web payment capture data may be validated by the client-side script based on at least one public key corresponding to the private key held by the payment system 106 and used to generate the cryptographic signature. The public key may be hardcoded into an application library or stored at a network resource that is identified in the client-side script. The public/private key pair used to sign and validate the web payment capture data may be long-lived such that the life of the keys may exceed the life of the web payment capture data and be used for numerous transactions.

With continued reference to FIG. 1, prior to being accessed by a user, the merchant may access one or more GUIs provided by the payment system 106 to customize the payment collection GUI. For example, the merchant may be provided with a menu of a plurality of user interface elements (e.g., payment selection buttons, menus, checkboxes, input fields, and/or the like) and design elements (e.g., colors, fonts, and/or the like). The merchant's selections may be stored by the payment system 106 and used to generate the web payment capture data that is used by the client computing device 108 to generate the payment collection GUI within the merchant webpage 110.

With continued reference to FIG. 1, the user may input payment information into the merchant webpage 110 through the client computing device 108. Upon receiving the input payment information, the client computing device 108 may execute a client-side script or the same client-side script used to validate the web payment capture data may still be running. The client-side script may, for example, encrypt the payment information for communication to the payment system 106. The payment information may be encrypted based on a public key embedded in the web payment capture data, where the public key corresponds to a private key held by the payment system 106. The public/private key pair used to encrypt and decrypt the payment information is a different public/private key pair than the key pair used to generate and validate the cryptographic signature.

The client-side script may also normalize the structure of the payment information received through the payment collection GUI prior to encrypting the data such that a standardized mechanism (e.g., an API hosted by the payment system 106) may be used to invoke one or more different payment services. For example, the client-side script may format the payment information by fields having predetermined lengths, orders, abbreviations, and/or the like within a data structure. The client-side script may communicate the payment information, after being encrypted, directly to the payment system 106 without passing through the merchant system 104. The client-side script may communicate the payment information as a normalized payload associated with the payment information. As an example, the client-side script may send the payment information in a Javascript Object Notation (JSON) Web Encryption (JWE) format. The JWE data may include the payment information and, in some examples, may also include the web payment capture data or a portion thereof for validation. By normalizing the acceptance and formatting of the payment information, the merchant webpage 110 is able to accept multiple types of payment options utilizing a single client-side script (e.g., executing the client-side script on the client computing device 108) and payment collection GUI without requiring the merchant to set up the capabilities of capturing and processing each payment method individually. Normalizing the acceptance and formatting of the payment information may reduce required troubleshooting by the merchant due to errors that may arise due to differences in user browser version, platform version, hardware type, display size, or network hopping between mobile and traditional networks.

With continued reference to FIG. 1, the payment system 106 may validate the payment information. The payment system 106 may validate the payment information after the payment system 106 validates the web payment capture data. The validation of web payment capture data by the payment system 106 may ensure that the web payment capture data aligns with the merchant's stated intended use when the web payment capture data was requested with the web payment capture request. The payment information may be validated with the web payment capture data or the payment data capture request to ensure the payment information correlates to the intended use stated by the merchant. In non-limiting embodiments, the payment system 106 may be in communication with one or more third-party payment providers, such as Apple Pay®, Google Pay®, PayPal®, and/or the like, that correspond to the various payment methods made available to the user. The payment system 106 may communicate with such third-party payment providers prior to generating the transient payment token such that the parameters of the transient payment token are adapted for a particular third-party payment provider. The third-party payment provider may be related to the payment method chosen by the user. The communication with the one or more third-party payment providers may be initiated through an API call. The third-party payment providers may be configured to accept the transient payment token.

With continued reference to FIG. 1, after the validation of the payment information, the payment system 106 may communicate some or all of the payment information to a token management system 112. The token management system 112 may store the payment information in a token database 114 in association with a token. For example, the token management system 112 may generate a transient payment token based on the payment information. The transient payment token may be communicated directly to the client computing device 108 or through the merchant system 104. The transient payment token may be a data structure containing the encrypted payment information from the user. The transient payment token allows sensitive information to be given by a user without the merchant being given direct access to the sensitive information. The transient payment token thus allows for a separation between the data capture and the data processing portions of processing a transaction such that the merchant is capable of processing a transaction with the transient payment token without ever storing the sensitive payment information from the user. The transient payment token may be replicated on multiple data storage devices and/or servers to achieve high availability. Transient payment tokens may be shared among a group of two or more merchants such that each merchant of the group may be authorized to use the transient payment token. For example, the merchants may be added to a merchant group based on a merchant identifier associated with each merchant that uniquely identifies the merchant.

In non-limiting embodiments, the payment information may include sensitive information and non-sensitive information. The sensitive information may be at least a portion of the total information included in the payment information. The sensitive information (e.g., Sensitive Authentication data (SAD), such as a PAN, card verification value, personal identification number (PIN), and/or the like) from the payment information may be stored in active memory (e.g., RAM) only. Keeping sensitive information in active memory increases the security of the transaction because it avoids writing the sensitive information to one or more data storage devices. Less sensitive information (e.g., token value, merchant identifier, user identifier, and/or the like) may be stored on a hard disk. Less sensitive information may be stored on a hard disk for audit log purposes and/or for recovery purposes in the event of a catastrophic scenario (e.g., a power failure). The sensitive information may be stored in active memory on the client computing device 108, and may be removed from active memory of the client computing device 108 after being communicated to the payment system 106. The sensitive information may be stored in the active memory of the payment system 106 until the transient payment token expires or is used to initiate a payment transaction or until after the payment system 106 communicates the sensitive information to the token management system 112. The token management system 112 may store the sensitive information in active memory until the transient payment token expires or is used to initiate a payment transaction.

In non-limiting embodiments, the payment information may be represented by the transient payment token with a non-data related/correlated random identifier (e.g., a token value). The random identifier may be generated using a cryptographic random number generator, for example. The transient payment token may be intended for imminent use, allowing for a time-limited preservation of the payment information. The transient payment token may have a predetermined expiration time (e.g., 1 minute, 10 minutes, 15 minutes, and/or the like). Once the expiration time is reached, the transient payment token may destroy itself (e.g., be permanently deleted from active memory and/or hard disk). The expiration time may be encoded into the transient payment token and/or may be specified in the token database 114. The random identifier and/or any other parameter of the transient payment token may utilize integrity checks (e.g. the last 4 digits may be Cyclic Redundancy Checks (CRC) of previous random characters) and may include the origin datacenter (e.g., an identifier of the token management system 112 or specific component thereof) encoded into the first digits to reduce replication issues. In non-limiting embodiments, the transient payment token may be cryptographically signed by the token management system 112 and may contain a JWT payload representing the sensitive payment information. The cryptographic signature may be generated with a private key of another public/private key pair that is used to validate that the payload was generated by the token management system 112.

In non-limiting embodiments, upon generating the transient payment token, the token management system 112 may communicate the transient payment token to the payment system 106. In non-limiting embodiments, the token management system 112 may communicate the transient payment token directly to the client computing device 108, which means that the transient payment token does not pass through the merchant system 104, although it may be routed through multiple devices, servers, and/or systems while communicated through a network 101. The transient payment token differs from conventional payment tokens due to the ability of the transient payment token to apply to transactions other than manual card transactions, the ability to store sensitive data corresponding to the transient payment token in memory only instead of on a hard disk, the ability of the transient payment token to be used repeatedly in a time period instead of just one time, and the ability to link the transient payment token to the original payment data capture request through the web payment capture data.

With continued reference to FIG. 1, in response to receiving the transient payment token, the payment system 106 may communicate the transient payment token to the client computing device 108 and/or merchant system 104. For example, in non-limiting embodiments, the payment system 106 or the token management system 112 may communicate the transient payment token directly to the merchant system 104. The payment system 106 may also communicate the transient payment token directly to the client computing device 108 through the merchant webpage 110 (e.g., through a browser connection established with an embedded frame on the merchant webpage 110). Once received by the client computing device 108, the browser may communicate (e.g., pass) the transient payment token from local memory to the merchant system 104. As an example, the transient payment token may be communicated from the client computing device 108 to the merchant system 104 through the merchant webpage 110. Such communication may be performed by the client-side script and may be transparent to the user.

With continued reference to FIG. 1, in non-limiting embodiments, the merchant webpage 110 may be adapted to initiate the transaction through a single API call with the payment system 106, transaction processing system 102, or another separate system (e.g., such as a third party payment gateway or payment provider) configured to accept the transient payment token. Each payment method may be separated into its own frame within payment collection GUI on the merchant webpage. Separation of the fields associated with each payment method into independent frames avoids cross-contamination between frames such that, if an error or issue develops in one frame, it does not impact other payment methods.

With continued reference to FIG. 1, the merchant system 104 may communicate the transient payment token to the payment system 106 and/or the transaction processing system 102 as part of a transaction request. For example, the transaction request may be communicated to the payment system 106 which then communicates some or all of the transaction request, including the transient payment token, to the transaction processing system 102. In some non-limiting embodiments, the payment system 106 may replace the transient payment token with the payment information stored in memory, based on communicating with the token management system 112, prior to communicating the transaction request to the transaction processing system 102. In other non-limiting embodiments, the payment system 106 may communicate the transient payment token to the transaction processing system 102 and the transaction processing system 102 may communicate with the token management system 112 to obtain the payment information associated with the transient payment token. The transaction processing system 102 will be able to process the payment using the payment information as if the transaction processing system 102 had received the payment information from the merchant system 104 directly. For example, the transaction processing system 102 may generate an authorization request based on the payment information that is communicated to an issuer system (not shown in FIG. 1) for processing. The authorization request may, for example, approve the processing of a payment, approve processing of a claim or refund, or approve other payment related services.

In non-limiting embodiments, the transient payment token may be used to conduct other payment transactions that do not utilize an authorization request, such as facilitating a consumer to enter debit card information to facilitate a claim payout and/or other credit, debit, and/or payment services that may not utilize an authorization request.

With continued reference to FIG. 1, after the transaction is processed (e.g., after the authorization request is generated), the transaction processing system 102 may command the token management system 112 to permanently erase the payment information. The token management system 112 may then permanently erase the data from the token database 114 by clearing the sensitive information from active memory and deleting any other payment information from the hard disk. In some non-limiting embodiments, instead of being erased automatically after a transaction is processed, the token management system 112 may automatically erase the payment information after a predetermined period of time elapses and/or the transient payment token expires. In such examples, the transient payment token may be used multiple times within a predetermined time before expiration. The transient payment token allows the merchant to process the payment without ever having direct possession of the payment information provided by the user, resulting in increased security of the transaction and end-to-end encryption of all captured data.

Figure 2:
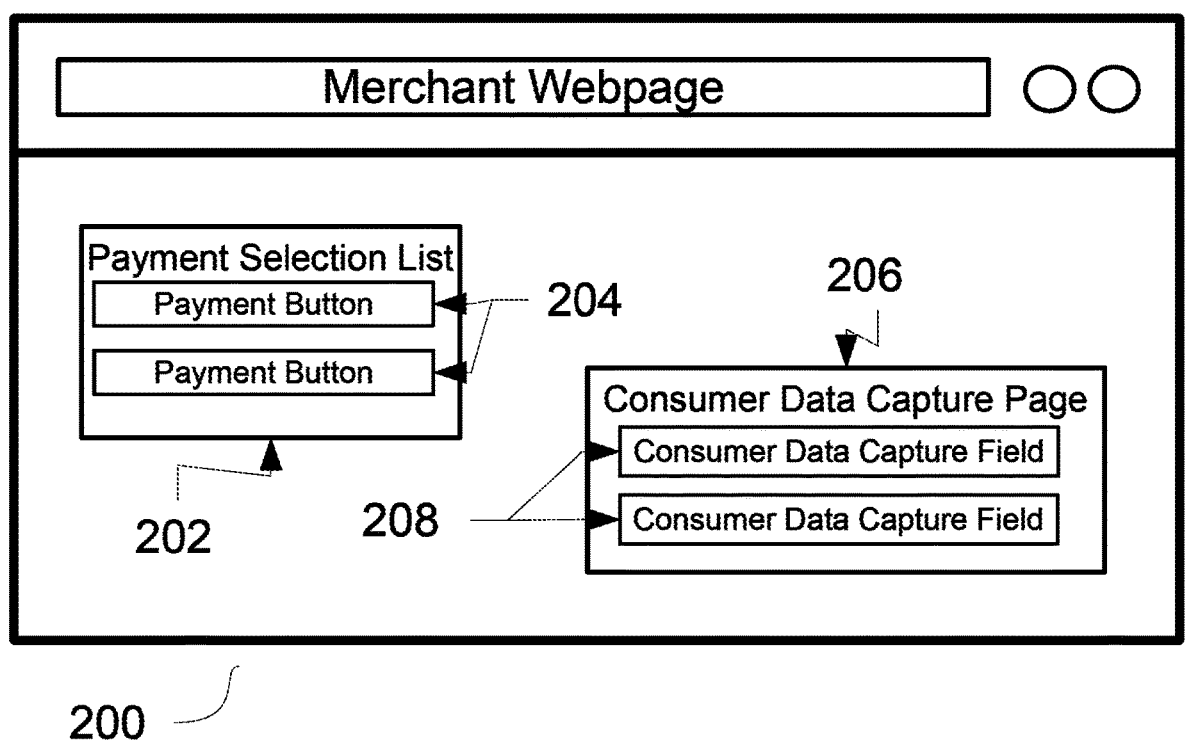
FIG. 2 illustrates a merchant webpage according to non-limiting embodiments.

FIG. 2 depicts a non-limiting embodiment of a payment collection GUI 200 of a merchant webpage. The merchant webpage may be loaded with a client-side script. The payment collection GUI 200 may be defined by web payment capture data and may allow the merchant to imbed GUI elements onto the merchant webpage. The payment collection GUI 200 may also include one or more individual GUIs, such as at least one payment selection list 202 and at least one consumer data capture page 206. The payment selection list 202 and the consumer data capture page 206 may be on separate frames, popup windows, tabs, and/or the like. The GUI elements may be incorporated into the payment selection list 202 and the consumer data capture page 206. The GUI elements may include at least one selectable option, such as a menu, checkbox, payment selection button 204, consumer data input field 208, and/or any combination thereof. The selectable options may be arranged on the payment collection GUI 200 or in a frame embedded on the payment collection GUI 200. The payment collection GUI 200 may be defined based on the type of device or browser used by the user to access the merchant webpage, the merchant, the amount of the purchase, or other data provided by and/or obtained from the merchant and/or user. The payment collection GUI 200 may be generated each time a payment request is received by the merchant.

With continued reference to FIG. 2, the payment collection GUI 200 may display at least one payment selection list 202 that contains at least one payment button 204. The payment selection list 202 may be generated by the client-side script. The payment selection list 202 may be imbedded in the merchant webpage. Each payment button 204 will correspond to a different payment method, such as a credit card, a debit card, third party payment systems (e.g., Apple Pay®, Google Pay®, PayPal®, and/or the like), wire transfer, online money transfer, and/or the like. The merchant may provide a predetermined list of payment methods to be included in the payment selection list 202. All payment buttons 204 may be displayed directly on the payment collection GUI 200. In non-limiting embodiments, the location of the payment selection list 202 on the payment collection GUI 200 may be determined by the merchant.

With continued reference to FIG. 2, the order of the payment buttons 204 may be dynamic, such that each generation of the payment selection list 202 may list the payment buttons 204 in a different order than a previously generated payment selection list 202. The top listed payment button 204 may correspond to a payment method determined to be most likely to be used by the user. The order of the payment buttons 204 may be based on the user device, the type of browser used by the user, the amount of the payment, the merchant, and/or other information obtained about the user, merchant, or transaction. At least one payment button 204 may be located in a drop down menu. In non-limiting embodiments, payment buttons 204 located in the drop down menu may be less likely to be selected by the user than payment buttons 204 shown directly on the payment collection GUI 200.

With continued reference to FIG. 2, the payment collection GUI 200 may display at least one consumer data capture page 206. The consumer capture page 206 may be generated by the client-side script. The consumer data capture page 206 may be generated after a payment button 204 has been selected and may be based on the selected payment button. The client-side script may communicate between the payment selection list 202 window and the consumer data capture page 206. The consumer data capture page 206 may be imbedded in its own frame within the merchant webpage.

With continued reference to FIG. 2, the consumer data capture page 206 may include at least one consumer data capture field 208. The consumer data capture field 208 may allow the user to input payment information, such as credit card number, card security code, zip code, address, name, payment amount, expiration date, PAN, card verification value, PIN, and/or the like. In non-limiting embodiments, some fields may be automatically entered by the merchant. The user input is captured by the client-side script. The consumer data capture fields 208 may depend on the payment button 204 selected. By decoupling the payment selection lists from the consumer data capture pages, the merchant is able to ensure the payment experience is properly and seamlessly imbedded within their merchant payment experience.

By basing the consumer data capture pages 206 on the selected payment button 204, the merchant is able to ensure that the consumer data capture fields 208 include all necessary information that must be captured for the selected payment method without including unused consumer data capture fields 208 that may not be relevant to the selected payment method. This allows for a unified method for invoking web payment processing of different payment types, allowing the merchant webpage to support each payment acceptance technology and authorize and capture the payment across a multitude of supported technologies. By generating the consumer data capture pages 206 based on the selected payment button 204, the merchant no longer needs to create complex processing to handle all potential payment options where each payment method typically requires different payment solutions that are processed in different manners. Instead, the capture and processing of the payments is encapsulated in a common interface.

Figure 3:
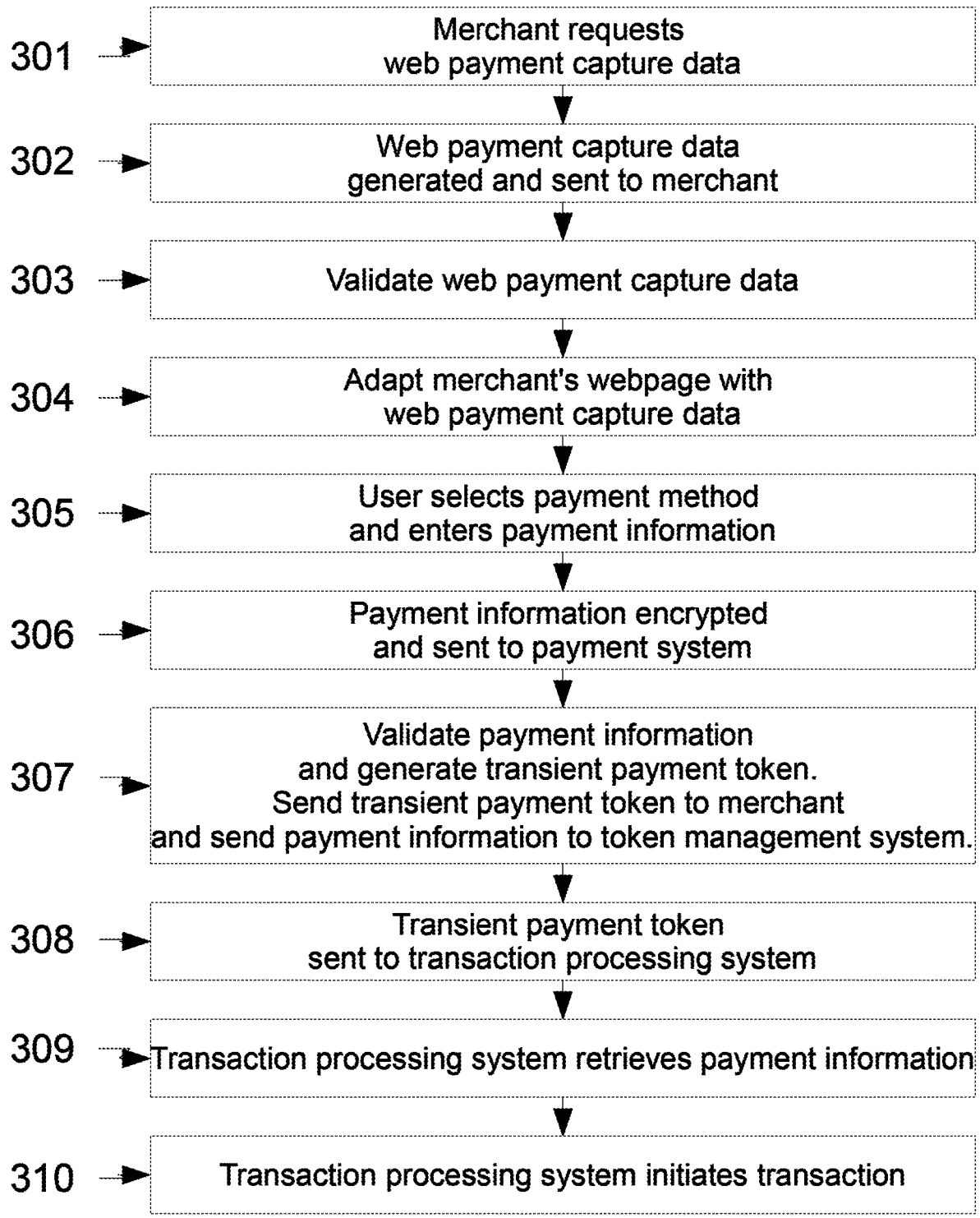
FIG. 3 illustrates a flow diagram of a method for integrating multiple payment options on a merchant webpage and conducting a transaction according to non-limiting embodiments.

Referring now to FIG. 3, shown is a flow diagram of a transaction according to non-limiting embodiments. In step 301, a merchant will communicate a request for web payment capture data to a payment system. The merchant may communicate the request when a user indicates that they intend to initiate a transaction, such as a purchase. The user can indicate the intent by selecting a checkout link or selecting a link to make a payment on a merchant's webpage. The payment data capture request may include information on the intended usage of the web payment capture data, e.g., using the web payment capture data to adapt a merchant webpage to include a multi-field microform or using the web payment capture data to prebuild a checkout page of the merchant webpage. The web payment capture data may also include information to initiate data to capture GUI elements.

In step 302, in response to receiving the request for web payment capture data, the payment system may generate the web payment capture data and communicate the web payment capture data to the merchant system. The merchant may communicate the web payment capture data to the merchant's website. The web payment capture data may be signed with a private key of a public/private key pair that allows the cryptographic signature (e.g., digital signature) be verified with any entity having the public key.

In step 303, the web payment capture data may be validated by the client-side script downloaded to the client computer. The validation may be based on at least one public key corresponding to the private key held by the payment system and used to generate the cryptographic signature.

In step 304, the web payment capture data may adapt the merchant's webpage to embed within the merchant webpage a payment collection GUI to allow a user to select a payment method and enter payment information. The payment collection GUI may be generated by a client-side script. The payment collection GUI may be presented in a frame embedded within the merchant webpage. The payment collection GUI may allow the user to select a payment method and may allow the user to enter payment information.

In step 305, the user selects a payment method from within the payment collection GUI. Once the payment method is selected, the client-side script may generate a further portion of a payment collection GUI (e.g., a consumer data capture page) with at least one consumer data capture field to allow the user to enter payment information. The consumer data capture page may be presented in a frame embedded within the merchant webpage. The user may then enter the payment information into the consumer data capture fields.

In step 306, the client-side script may encrypt the payment information and communicate the payment information and the web payment capture data to the payment system. The client-side script may ensure that the merchant is prohibited from accessing sensitive information of the payment information.

In step 307, the payment system may validate the payment information and the web payment capture data and generate a transient payment token. The transient payment token is then communicated to the merchant system and the payment information is communicated to a token management system. The transient payment token may be communicated to the merchant through the user device and/or the merchant webpage. The transient payment token may be generated by the token management system and the payment information is stored within a token database of the token management system.

In step 308, the merchant system may communicate the transient payment token to a transaction processing system to initiate a transaction, such as a payment.

In step 309, the transaction processing system retrieves the payment information from the token management system based on the transient payment token. The payment information may be stored in a token database of the token management system.

In step 310, the transaction processing system authorizes the transaction. The transaction may include processing a payment using the payment information provided by the user.

Figure 4:
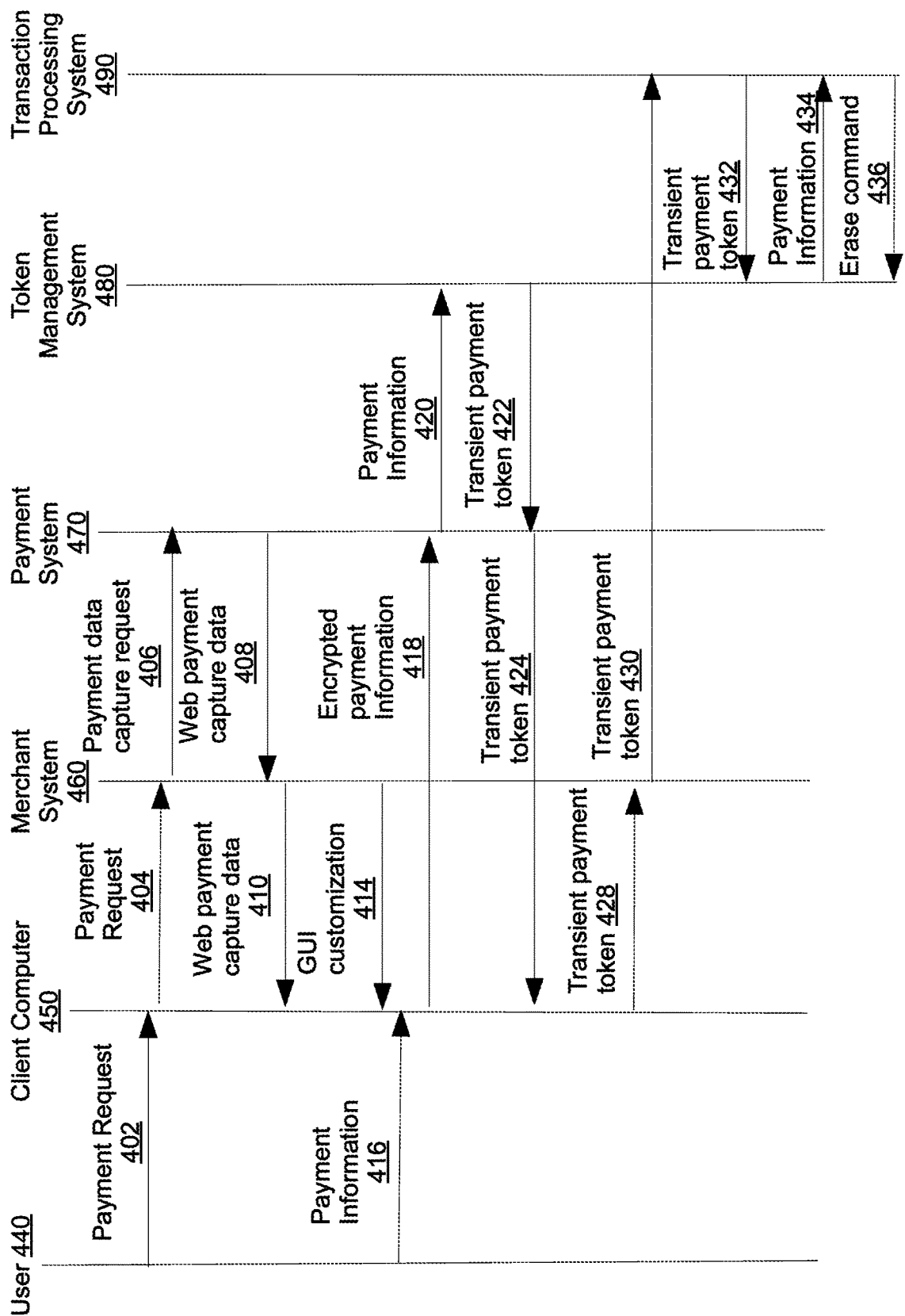
FIG. 4 illustrates a sequence diagram of a method for integrating multiple payment options on a merchant webpage and conducting a transaction according to non-limiting embodiments.

Referring now to FIG. 4, shown is a sequence diagram showing the flow of data and actions performed during a transaction according to a non-limiting embodiment. In step 402, a payment request is communicated from a user 440 to a client computer 450. A merchant webpage may be presented on the client computer 450. The payment request may be initiated by a user by choosing one or more selectable options on the merchant webpage, such as buttons, links, and/or the like. In step 404, the client computer 450 communicates the payment request to a merchant system 460. The merchant system 460 then communicates a payment data capture request to a payment system 470 in step 406. The payment data capture request may be based on the payment request received from the client computer 450.

With continued reference to FIG. 4, in step 408, the payment system 470 communicates web payment capture data to the merchant system 460. The web payment capture data may be generated based on the payment request. In step 410, the web payment capture data is communicated from the merchant system 460 to a client-side script on the client computer 450. The merchant system 460 may customize the payment collection GUI on the merchant webpage prior to the client accessing the client.

With continued reference to FIG. 4, in step 416, the user 440 may enter payment information through the client computer 450. The client-side script on the client computer 450 may encrypt the payment information. The client computer 450 may then communicate the encrypted payment information to the payment system 470 in step 418. In non-limiting embodiments, the client-side script on the client computer 450 may communicate the encrypted payment information to the payment system 470 in step 418. The web payment capture data may be communicated with the encrypted payment information to the payment system 470 in step 418.

With continued reference to FIG. 4, in step 420, the payment system 470 may communicate the payment information to a token management system 480. The token management system 480 may generate a transient payment token based on the payment information. In step 422, the token management system 480 may communicate the transient payment token to the payment system 470. The payment system 470 may then communicate the transient payment token to the client computer 450 in step 424. In non-limiting embodiments, the token management system 480 may communicate the transient payment token directly to the client computer 450.

With continued reference to FIG. 4, the client computer 450 may initiate the payment in step 428 by communicating the transient payment token to the merchant system 460. The transient payment token may be communicated through a client-side script on the client computer 450. The merchant system 460 may then communicate the transient payment token to the transaction processing system 490 in step 430. In non-limiting embodiments, the client computer 450 communicates the transient payment token to the payment system 470, which then communicates some or all of the transaction request to the transaction processing system 490.

With continued reference to FIG. 4, in step 432, the transaction processing system 490 communicates the transient payment token to the token management system 480. The token management system 480 may then communicate payment information based on the transient payment token to a transaction processing system 490 in step 434. The transaction processing system 490 may then process the transaction based on the payment information. After processing the payment information, the transaction processing system 490 may communicate an erasure command in step 436 to the token management system 480 to command the token management system 480 to permanently erase the payment information.

Figure 5:
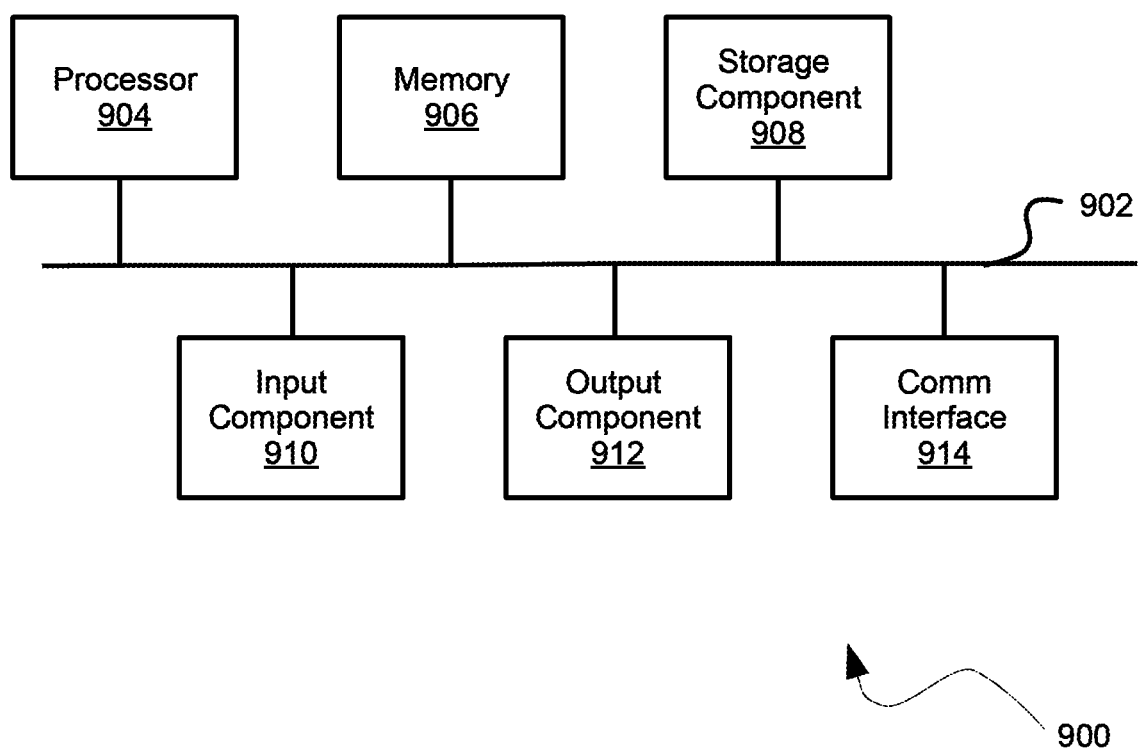
FIG. 5 illustrates example components of a device used in connection with non-limiting embodiments.

Referring now to FIG. 5, shown is a diagram of example components of a device 900 according to non-limiting embodiments. Device 900 may correspond to the client computing device 108, merchant system 104, payment system 106, transaction processing system 102, token management system 112, and/or token database 114 in FIG. 1 and/or the like. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 5. Additionally, or alternatively, a set of components (e.g., one or more components) of device 900 may perform one or more functions described as being performed by another set of components of device 900.

As shown in FIG. 5, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method comprising:
receiving, from a merchant system associated with a merchant webpage, a payment data capture request;
generating, with at least one processor, web payment capture data based on the payment data capture request, the web payment capture data configured to adapt the merchant webpage to receive payment information input by a user;
communicating, to the merchant system, the web payment capture data;
receiving, directly from a client computer via at least one client-side script executed by the client computer based on the web payment capture data, the payment information input by the user;
generating, with at least one processor, a transient payment token based on the payment information, the transient payment token comprising the payment information after being encrypted; and
directly communicating the transient payment token to the client computer.

2. The computer-implemented method of claim 1, further comprising receiving, from the merchant system associated with the merchant webpage, a selected payment method, and generating at least one consumer data capture field based on the selected payment method.

3. The computer-implemented method of claim 2, further comprising generating normalized payment information by normalizing the payment information based on the payment method, wherein the transient payment token comprises the normalized payment information.

4. The computer-implemented method of claim 1, wherein the web payment capture data is configured to adapt the merchant webpage by:
   generating, on the merchant webpage, at least a portion of a graphical user interface (GUI) configured to receive the payment information from the user; and
   configuring the at least one client-side script to validate the web payment capture data and process the payment information.

5. The computer-implemented method of claim 1, further comprising generating a cryptographic signature of the web payment capture data, wherein the at least one client-side script is configured to validate the web payment capture data based on the cryptographic signature.

6. The computer-implemented method of claim 1, further comprising encrypting the payment information with the at least one client-side script based on a public key embedded in the web payment capture data.

7. The computer-implemented method of claim 1, wherein the web payment capture data is configured to adapt the merchant webpage by configuring the merchant webpage to initiate a transaction through a single Application Programming Interface (API) call.

8. The computer-implemented method of claim 1, wherein the at least one client-side script is configured to pass the transient payment token from the client computer to the merchant system via the merchant webpage.

9. The computer-implemented method of claim 1, further comprising:
   receiving the transient payment token from the merchant system; and
   generating an authorization request based on the transient payment token.

10. The computer-implemented method of claim 1, wherein at least a portion of the payment information is stored only in active memory.

11. A system for integrating multiple payment options on a merchant webpage, comprising at least one processor programmed or configured to:
   receive, from a merchant system associated with a merchant webpage, a payment data capture request;
   generate web payment capture data based on the payment data capture request, the web payment capture data configured to adapt the merchant webpage to receive payment information input by a user;
   communicate, to the merchant system, the web payment capture data;
   receive, directly from a client computer via at least one client-side script executed by the client computer based on the web payment capture data, the payment information input by the user;
   generate a transient payment token based on the payment information, the transient payment token comprising the payment information after being encrypted; and
   directly communicate the transient payment token to the client computer.

12. The system of claim 11, wherein the at least one processor is further programmed or configured to receive, from the merchant system associated with the merchant webpage, a selected payment method, and generate at least one consumer data capture field based on the selected payment method.

13. The system of claim 12, wherein the at least one processor is further programmed or configured to generate normalized payment information by normalizing the payment information based on the payment method, wherein the transient payment token comprises the normalized payment information.

14. The system of claim 11, wherein the web payment capture data is configured to adapt the merchant webpage by:
   generating, on the merchant webpage, at least a portion of a graphical user interface (GUI) configured to receive the payment information from the user; and
   configuring the at least one client-side script to validate the web payment capture data and process the payment information.

15. The system of claim 11, wherein the at least one processor is further programmed or configured to generate a cryptographic signature of the web payment capture data, wherein the at least one client-side script is configured to validate the web payment capture data based on the cryptographic signature.

16. The system of claim 11, wherein the at least one processor is further programmed or configured to encrypt the payment information with the at least one client-side script based on a public key embedded in the web payment capture data.

17. The system of claim 11, wherein the web payment capture data is configured to adapt the merchant webpage by configuring the merchant webpage to initiate a transaction through a single Application Programming Interface (API) call.

18. The system of claim 11, wherein the at least one client-side script is configured to pass the transient payment token from the client computer to the merchant system via the merchant webpage.

19. The system of claim 11, wherein the at least one processor is further programmed or configured to:
   receive the transient payment token from the merchant system; and
   generate an authorization request based on the transient payment token.

20. A computer program product for integrating multiple payment options on a merchant webpage, comprising at least one non-transitory computer-readable medium including program instructions that, when executed by at least one processor, cause the at least one processor to:
   receive, from a merchant system associated with a merchant webpage, a payment data capture request;
   generate web payment capture data based on the payment data capture request, the web payment capture data configured to adapt the merchant webpage to receive payment information input by a user;
   communicate, to the merchant system, the web payment capture data;
   receive, directly from a client computer via at least one client-side script executed by the client computer based on the web payment capture data, the payment information input by the user;
   generate a transient payment token based on the payment information, the transient payment token comprising the payment information after being encrypted; and
   directly communicate the transient payment token-to the client computer.

* * * * *